June 1, 1965   F. JOCHIM   3,186,815
TEMPERED GLASS

Filed July 24, 1959   3 Sheets-Sheet 1

INVENTOR.
FRIEDRICH JOCHIM
BY *Bauer and Seymour*
ATTORNEYS

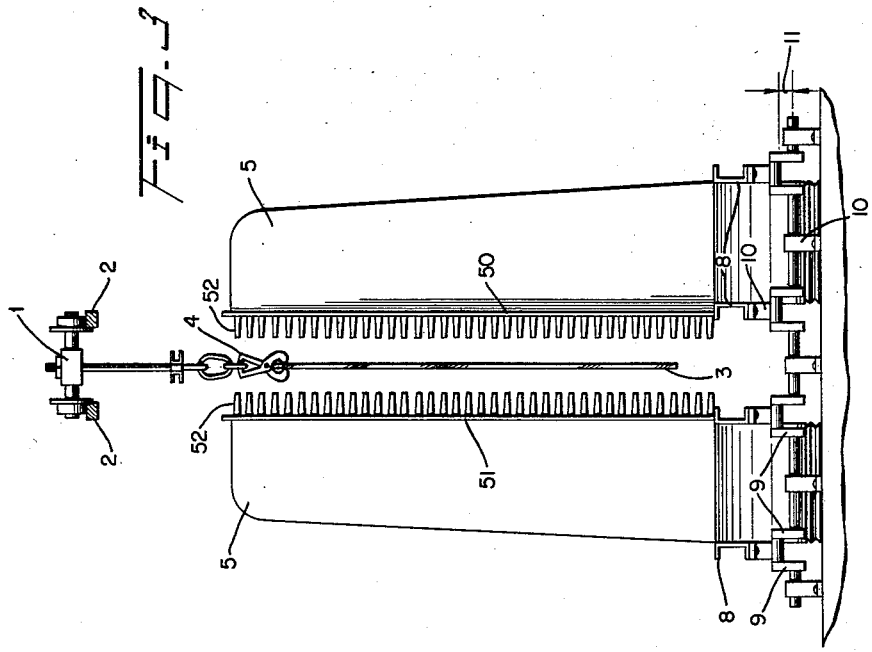
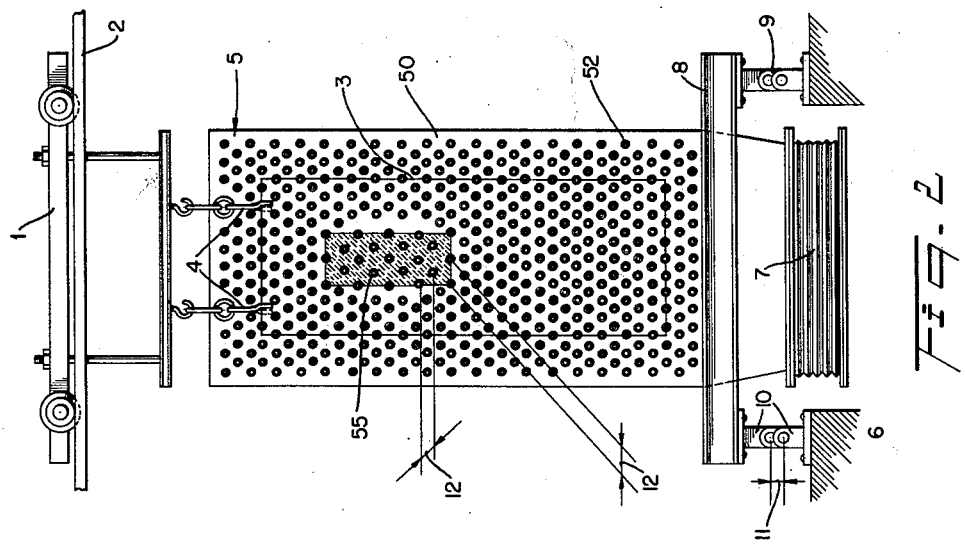

June 1, 1965   F. JOCHIM   3,186,815
TEMPERED GLASS

Filed July 24, 1959   3 Sheets-Sheet 3

INVENTOR.
FRIEDRICH JOCHIM
BY
*Bauer and Seymour*
ATTORNEYS 3,186,815
TEMPERED GLASS
Friedrich Jochim, Herzogenrath, Germany, assignor to Compagnie de Saint-Gobain, Paris, France
Filed July 24, 1959, Ser. No. 829,400
Claims priority, application France, Aug. 8, 1958, 772,152
4 Claims. (Cl. 65—115)

This invention elates to the manufacture of tempered glass sheets which include zones which remain clear and transparent even when the remainder of the sheet has been shattered into that multiplicity of small fragments which is characteristic of a tempered glass sheet. These unbroken areas constitute ports of visibility through an otherwise obscure sheet. Such glass is useful, for example, in automobile windshields, bceause they are very strong due to the tempering and retain their transparency in an area before the driver at least during the time that is necessary to stop the vehicle. In prior attempts to solve this problem, tempered glass windshields have been used in which a substantial zone of visibility has been provided in front of the driver by leaving the glass untempered in that area. Glasses have also been made in which breaking only affects a part, the other part remaining intact. Furthermore, according to a known process, glasses have been made which upon breaking exhibit a pattern of rupture in the form of a honeycomb in which small pieces of glass of practically round shape are surrounded by a network of glass particles, a pattern which is obtained during the tempering either by interposing screens which cover part of the sheet during heating or during the cooling.

An object of the invention is to eliminate the use of screens while obtaining a glass sheet the levelness of which is not affected by the tempering and in which ports of selected size and shape can be made to provide areas of visibility.

The process according to the invention is characterized in that the glass sheet after being heated to its initial tempering temperature, which is above the strain point and usually between the upper annealing point and the softening point, is blown with air jets differently spaced in different zones.

In that zone which is intended to remain transparent and to retain its unity even when the remainder of the glass sheet disintegrates, the interior of that area which constitutes the port of visibility, the jets are applied in closed paths, preferably circular, which touch each other at their circumferences while the glass outside the port is blown in closed paths, for instance circular, which intersect one another.

In the preferred form of the invention the hot sheet is brought to rest before the jets are applied and the jets are then applied with circular translatory motion. Each jet travels in a fixed path on the surface of the glass. An advantage can be gained by providing jets which may be applied with different intensity to the paths inside the port and to those outside the port.

Another object of the invention is to provide an apparatus which is capable of carrying out the invention with speed and efficiency. A preferred apparatus for this purpose includes a blower which is moved with circular translatory motion near the surface of the glass and which includes nozzles directed toward the glass which are so arranged that the space between the nozzles directed toward the portion of the sheet which is to be the port of visibility is equal to the diameter of the circular motion imposed on the blowing apparatus, whereas the spacing of the other nozzles, which are directed upon the remainder of the sheet which is to have the ability to shatter into fragments when it breaks, is inferior to that diameter.

It is good practice to place the nozzles directed toward the port upon a movable member and to supply them with air at a pressure which can be regulated independently from that of the remainder of the sheet.

The above and further objects and novel features of the invention will more fully appear from the following description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a diagrammatic view toward the face of a plate in position to be tempered showing the locations of the blowing nozzles and their spacing in front of the port of visibility and in front of the remainder of the sheet;

FIG. 2 is an elevational view of an apparatus adapted to meet the needs of the invention;

FIG. 3 is an end view of the apparatus of FIG. 2;

Figure 1:
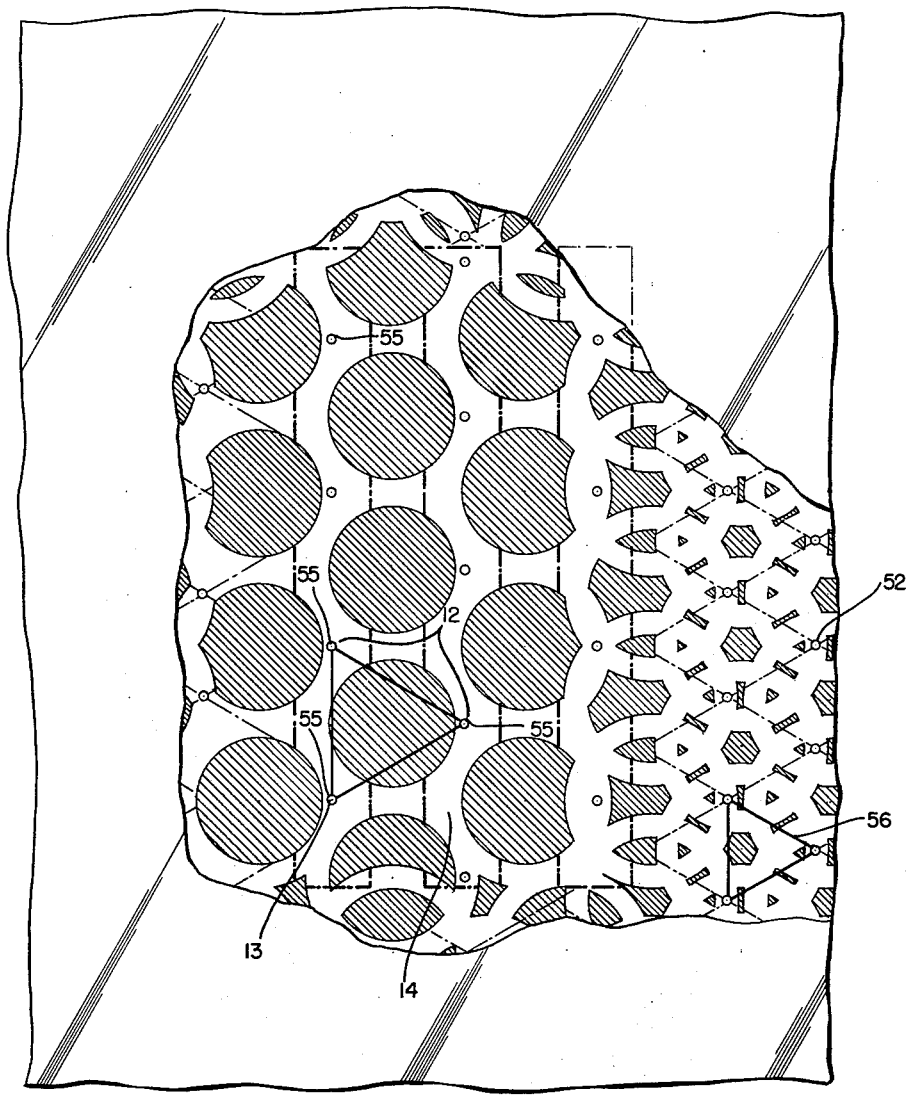

The typical tempering mechanism used in commercial practice involves three mechanisms, a suspension device, a furnace for heating the glass, and the blowers for cooling it. Two of these are diagrammatically indicated in FIGS. 2 and 3, one is a suspension mechanism including rails 2 and trolley 1, which engages the rails and which suspends tongs 4 which grip the upper edge of the glass sheet 3 and suspend it throughout the process. The suspended glass sheet is first introduced to a furnace where the glass is raised to a temperature at which tempering can be carried out. This temperature is usually above the upper annealing point and somewhat below the softening point. The method and apparatus for heating are not a part of this invention and it will be presumed that the reader is familiar with such apparatus. After the heating has been accomplished, the trolley with its suspended glass is moved between blowers 5 which include blowing boxes which are mounted upon eccentrics which impart to them circular translatory motion or some other translatory motion operating to move the nozzles in closed paths such as ellipses. The device shown in FIGS. 2 and 3 has a platform 8 supported on cranks 9 which are driven by means not shown and impart to the boxes circular translatory motion. The radius 11 of the crank is equal in the example shown to the half of the distance 12 of the nozzles corresponding to the port of visibility. Air is forced into the boxes through flexible connections 7 at the bottoms thereof. The blowers for generating the air pressure are not shown. The boxes 5 have opposed faces 50, 51, which are plates penetrated by nozzles 52 by which the air pressure within the boxes 5 is directed upon the glass sheet 3 so that the jet issuing from one nozzle against one face of the sheet is opposed by the jet issuing from the opposite nozzle against the other face of the sheet. Thus opposed jets play upon the same spot in a sheet and simultaneously trace the same paths.

In the practice of the invention the glass sheet is brought to rest between the blowing boxes before the air is turned on, and the air is turned off before the glass is removed from between the boxes. By this construction and method the jets are made to play directly only upon definite closed paths, the portions of the sheet outside these paths not being directly hit by the jet and being cooled to a lesser degree and only by air deflected from the closed paths upon which the jets play. This difference in cooling effect produces a major difference in the condition of the glass which has been directly hit by the jets with respect to the glass which has not.

The nozzles 52 are equally spaced except for nozzles 55 which are located opposite that area which is to constitute the port of visibility. In that area which is indicated by a shaded portion in FIG. 2, the nozzles are more widely spaced for a purpose which will now be described with reference to FIG. 1. In FIG. 1 the numerals 52 refer to the centers of the nozzles, which are describable as arranged in triangles, or in diamonds, or in quincunx. At 56 a diamond arrangement is indicated for these nozzles. In the central area of FIG. 1, which is to constitute the port of visibility, the numerals 55 indicate the centers of the nozzles, which are also arranged triangularly but in triangles having longer sides, that is to say providing wider spaces between nozzles.

In FIG. 1, the areas which are plain are those which are directly played upon by the jets from the nozzles during their translatory rotation, and the cross-hatched areas are those which are not directly played upon by the jets. It will be observed that in the central portion, constituting the port, the circles made by the jets are much larger and engage one another only at their circumferences whereas the circles made by the jets in the remainder of the sheet intersect adjacent circles and, so to speak, divide the sheet up into small fragments. It will be seen on FIG. 1 that the blowing nozzles are triangularly located, that is to say, are placed at the apices of equilateral triangles. The diameter of the circular translation executed by the blowing box is, for example, 30 millimeters.

In accordance with the invention the nozzles acting on the port could be spaced, in each triangle, at 30 millimeters apart while the size of the triangles outside the port could be about 20 millimeters on each side. As shown on FIG. 1 the zones of the sheet which are not directly hit by the jets are shown as crosshatched. In this way, admitting a divergence of the jets of about 5 millimeters, one obtains circular zones of about 25 millimeters in diameter which are not directly acted upon by the jets, whereas outside that region these zones are at most about 5 millimeters in diameter. Between the outside of the port and the remainder of the sheet one notes a zone of transition between dimensions of the untempered zones inside the port and the dimensions of the corresponding zones in the rest of the sheet.

It is to be understood that the figures given above are merely illustrative of the best practice and do not constitute a limit on the invention. The principle of the invention is that the jets of one group of orifices shall be applied so as to produce a small particle breaking pattern, in that section of the sheet upon which it operates, whereas the other group of orifices plays upon the portion of the sheet opposed to it so as to produce paths having a small particle breaking pattern within which are substantial areas which retain the breaking characteristics of untempered glass. Thus, the shattering of the sheet will obscure the vision in those areas where the small particle breaking pattern exists but will leave ports of visibility in the other section which retain substantially normal transparency. In the case of an automobile windshield, the ports of visibility will be located in front of the driver, will retain their transparency if the windshield breaks and will enable the driver to guide the vehicle safely while bringing it to a stop. Persons skilled in the art will modify the arrangement of the orifices to accomplish particular needs while operating well within the scope of the invention.

Referring to FIGS. 2 and 3, a trolley 1 moves on rails 2, the sheet of glass is suspended from the trolley by means of pinchers 4. The sheet is brought between the blowing boxes 5. In the simple mechanism represented the orifices are directed toward the glass sheet from a wall of the blowing box so that the distance of the orifices from the glass in the port zone is equal. The air pressure in this zone is uniform. The blowing boxes are supplied with air by apparatus known to the art through supports 6 and flexible tube 7. The blowing boxes are supported by transverse frames 8 which are connected to supports 10 by frames 9 on a crank shaft which constitutes the means for translating the blowing boxes. The radius 11 of the cranks used in the illustration is ½ of the distance 12 between the orifices which form the ports of visibility.

Figure 4:
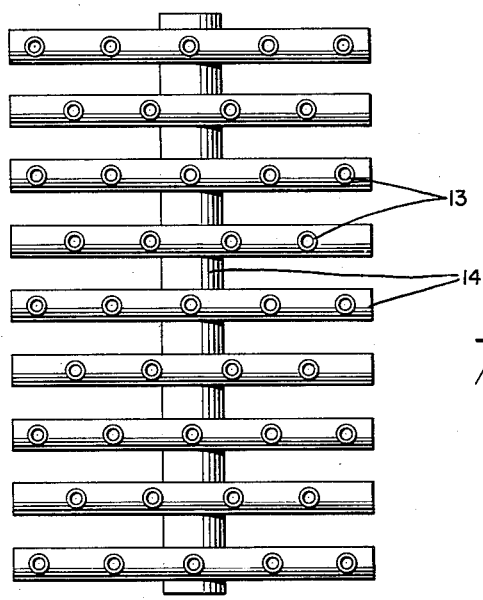
FIG. 4 is an elevational view of that part of the apparatus which permits one to obtain, adjacent the port, a blowing pressure different from the normal tempering pressure used on the remainder of the sheet.
Figure 5:
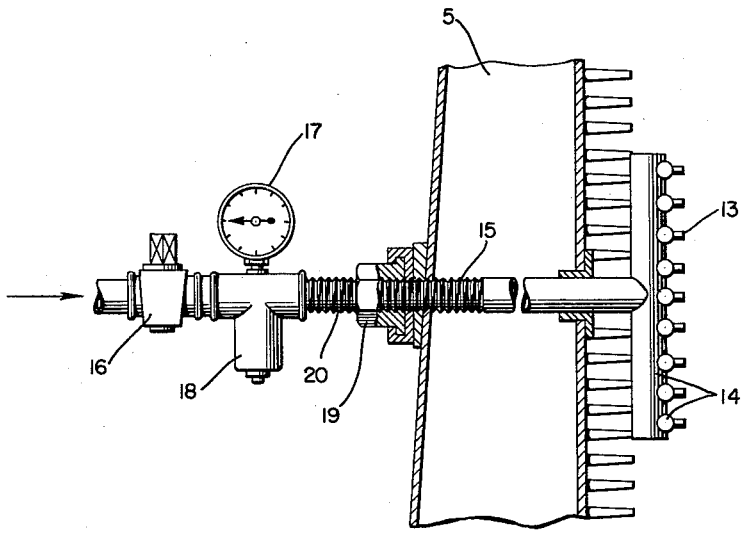
FIG. 5 shows the air supply for the apparatus according to FIG. 4.

In the modification shown in FIGS. 4 and 5 the nozzles 13 directed upon the port are in a wall 14 formed by tubes disposed in line. This wall is located at the end of a tube 15 which passes through the blowing box 5 and is connected by a valve 16, a manometer 17, and a pressure release valve 18 to a source of pressure other than that which supplies the blowing boxes. On the other hand, the same pressure may be applied to the valve and changed by the valve so as to produce a difference in the pressures applied against the port of visibility and that which is applied to the remainder of the sheet. The tube 15 can be moved in and out so as to bring the nozzles closer to or farther from the sheet by the screw and nut connection 19, 20.

In this modification it is possible to change the distance between the glass sheet and the blowing orifices which form the port of visibility and simultaneously by means of valve 16 to change the air pressure so that it may be either greater, the same, or less than that which is applied by the other orifices.

In both forms of the invention the orifices on opposite sides of the glass sheets are so operated as to direct their opposed jets in congruent paths on opposite sides of the sheet. It is not necessary that the boxes should be mounted on the same frame to accomplish this as they could be mounted on separate frames animated by identical movements but out of phase. It is also possible to move the nozzles in place of the boxes while the boxes remain still. Such mechanisms are complex and expensive. It is also possible to use fixed blowers and to move the sheet with translatory motion between them but this alternative also has objections. In a successful method of operation, good results were obtained for example with an air pressure of about 1 atm. the distance between the nozzles and the glass sheet being the shorter as possible, practically of the order of a few centimeters, the diameter of the orifice of the nozzles being of the order of the millimeter, the number of revolutions of the order of 60 to 100 per minute and the diameter of the circular translation executed by the blowing box of about 30 millimeters.

In FIG. 5 the air pressure is furnished at 5 atmospheres, the expansion valve at the left of the pressure-gauge 17 reduces this pressure to about 1 atmosphere so that the tube at the right of the pressure gauge and the nozzles are supplied with air at a pressure of the order of 1 atmosphere.

Although only a limited number of embodiments of the invention have been illustrated in the accompanying drawings and described in the foregoing specification, it is to be expressly understood that various changes, such as in the relative dimensions in the parts, materials used, and the like as well as the suggested manner of use of the apparatus of the invention, may be made therein without departing from the spirit and scope of the invention as will now be apparent to those skilled in the art.

What is claimed is:

1. A method of tempering a hot glass sheet that comprises applying to the surface of the sheet while the sheet is at rest jets of air in rings grouped in different sizes comprising at least one group of non-intersecting rings and one group of intersecting rings with different pressures of air being supplied to the different groups.

2. An apparatus for tempering hot glass sheets which comprises blowing means having orifices directed toward the position of the glass sheet, means to move the blowing means with translatory motion whereby to move the orifices in closed paths, a first set of orifices on each blowing means being more widely spaced than other orifices on the same blowing means, the distance between the orifices in the first set having a minimum roughly approximating the diameter of the translatory motion of the blowing means and the spacing of the other orifices being less than the said diameter, thereby producing intersection of the paths of adjacent ones of said other orifices.

3. Apparatus for blowing a hot sheet of glass comprising a multiplicity of orifices directed toward the locus of the sheet which is to be tempered, said multiplicity being divided into groups having different spacing between the orifices, means to move one group with respect to the other along closed paths with respect to the sheet, and means to supply cooling fluid at different pressures to the two groups along closed paths with respect to the sheet, the spacing between the orifices in one of the groups being such that their paths do not intersect, the spacing between the remaining orifices being such that their paths intersect to form a small particle breaking pattern.

4. Apparatus for tempering sheet glass comprising a multiplicity or orifices arranged in groups having different spacing between the orifices, means to move one of the groups with respect to the other in the direction of the sheet and along closed paths with respect to the sheet, and means to supply one group with cooling fluid at different velocity from that of the other along closed paths with respect to the sheet, the spacing between the orifices in one of the groups being such that their paths do not intersect, the spacing between the remaining orifices being such that their paths intersect to form a small particle breaking pattern.

References Cited by the Examiner

UNITED STATES PATENTS

| | | | |
|---|---|---|---|
| 1,916,174 | 6/33 | Long et al. | 65—115 X |
| 2,068,746 | 1/37 | Hinsey | 65—349 |
| 2,137,061 | 11/38 | Quentin | 65—114 |
| 2,167,294 | 7/39 | Despret | 65—114 |
| 2,244,715 | 6/41 | Long | 65—115 X |
| 2,254,227 | 9/41 | Lewis | 65—115 |
| 2,910,807 | 11/59 | Chan et al. | 65—115 |

FOREIGN PATENTS 541,049  11/41  Great Britain.

DONALL H. SYLVESTER, *Primary Examiner.*

CHARLES R. HODGES, IVAN R. LADY, ARTHUR P. KENT, MORRIS O. WOLK *Examiners.*